(12) United States Patent
Kang et al.

(10) Patent No.: US 11,427,472 B2
(45) Date of Patent: Aug. 30, 2022

(54) METHOD FOR PREPARING CARBON NANOTUBE DISPERSION

(71) Applicant: LG CHEM, LTD., Seoul (KR)

(72) Inventors: Kyung Yeon Kang, Daejeon (KR); Seung Yong Lee, Daejeon (KR); Seok Won Kim, Daejeon (KR); Hyun Joon Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 338 days.

(21) Appl. No.: 16/631,643

(22) PCT Filed: Jan. 21, 2019

(86) PCT No.: PCT/KR2019/000855
§ 371 (c)(1),
(2) Date: Jan. 16, 2020

(87) PCT Pub. No.: WO2019/146982
PCT Pub. Date: Aug. 1, 2019

(65) Prior Publication Data
US 2020/0172401 A1  Jun. 4, 2020

(30) Foreign Application Priority Data
Jan. 29, 2018 (KR) ........................ 10-2018-0010888

(51) Int. Cl.
*C01B 32/174* (2017.01)
*B29C 48/02* (2019.01)
(Continued)

(52) U.S. Cl.
CPC .......... *C01B 32/174* (2017.08); *B29C 48/022* (2019.02); *B29C 48/04* (2019.02);
(Continued)

(58) Field of Classification Search
None
See application file for complete search history.

(56) References Cited

U.S. PATENT DOCUMENTS 9,126,828 B2 * 9/2015 Ma ........................ C01B 32/174
2007/0221913 A1 * 9/2007 Lee ....................... C07D 209/58
546/37

(Continued)

FOREIGN PATENT DOCUMENTS

EP       2949624 A1    12/2015
JP    2015-115670 A     6/2015

(Continued)

OTHER PUBLICATIONS

Google patents machine translation of KR20120075706A, 9 pages. (Year: 2022).*

(Continued)

*Primary Examiner* — Niki Bakhtiari
*Assistant Examiner* — Emmanuel S Luk
(74) *Attorney, Agent, or Firm* — Dentons US LLP

(57) ABSTRACT

The present invention relates to a method for preparing a carbon nanotube dispersion, the method including mixing a dispersion solution including a dispersion solvent and a dispersant with carbon nanotubes to prepare carbon nanotube paste, extruding the paste to obtain solid carbon nanotubes, and introducing a second solvent to the solid carbon nanotubes, and homogenizing the carbon nanotubes, wherein the weight ratio of the dispersion solution and the carbon nanotubes is 1:1 to 9:1. According to the present invention, the mixing of a dispersant and carbon nanotubes is increased and the particle size is controlled by a wet method, so that a carbon nanotube dispersion having a viscosity controlled to a low level, excellent resistance properties, and a high concentration, may be provided.

7 Claims, 1 Drawing Sheet

(51) Int. Cl.
*B29C 48/00* (2019.01)
*B29C 48/04* (2019.01)
*B29K 105/00* (2006.01)
*B82Y 30/00* (2011.01)
*B82Y 40/00* (2011.01)

(52) U.S. Cl.
CPC ....... *B29K 2105/0064* (2013.01); *B82Y 30/00* (2013.01); *B82Y 40/00* (2013.01); *C01B 2202/28* (2013.01)

(56) References Cited

U.S. PATENT DOCUMENTS

| | | | |
|---|---|---|---|
| 2008/0287638 A1* | 11/2008 | Reynolds | C08G 18/2865 528/59 |
| 2010/0143701 A1* | 6/2010 | Zhu | B29C 70/081 428/323 |
| 2011/0210282 A1* | 9/2011 | Foley | B82Y 25/00 252/301.36 |
| 2012/0292578 A1* | 11/2012 | Bacher | C08J 3/2056 252/511 |
| 2014/0319429 A1* | 10/2014 | Nicolas | B29C 48/405 252/511 |
| 2015/0318542 A1* | 11/2015 | Morozumi | H01M 4/364 427/122 |
| 2015/0368108 A1 | 12/2015 | Sone | |
| 2016/0254072 A1* | 9/2016 | Park | H01B 1/18 252/503 |
| 2016/0340193 A1 | 11/2016 | Uejima | |
| 2017/0148970 A1* | 5/2017 | Yu | H01L 23/38 |
| 2018/0051172 A1* | 2/2018 | Kawagishi | H01M 8/0243 |
| 2018/0126350 A1 | 5/2018 | Kang et al. | |
| 2018/0240567 A1 | 8/2018 | Kang et al. | |
| 2019/0060878 A1* | 2/2019 | Kang | H01M 4/62 |
| 2019/0135634 A1* | 5/2019 | Kang | B30B 11/24 |

FOREIGN PATENT DOCUMENTS

| | | |
|---|---|---|
| JP | 2017-112319 A | 6/2017 |
| KR | 10-2012-0075706 A | 7/2012 |
| KR | 10-2016-0110401 A | 9/2016 |
| KR | 10-2016-0133711 A | 11/2016 |
| KR | 10-2017-0087226 A | 7/2017 |
| KR | 10-2017-0087229 A | 7/2017 |

OTHER PUBLICATIONS

Extended Search Report of European Patent Office in Appl'n No. 19744073.8, dated Nov. 10, 2020.

\* cited by examiner

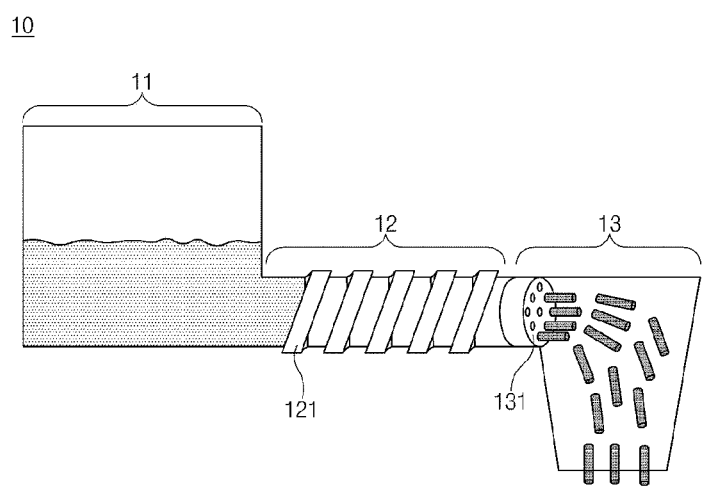

METHOD FOR PREPARING CARBON NANOTUBE DISPERSION

The present application is a National Phase entry pursuant to 35 U.S.C. § 371 of International Application No. PCT/KR2019/000855, filed Jan. 21, 2019, and claims priority to and the benefit of Korean Patent Application No. 10-2018-0010888, filed on Jan. 29, 2018, in the Korean Intellectual Property Office, the disclosures of which are incorporated herein in their entirety by reference.

FIELD

The present invention relates to a method for preparing a carbon nanotube dispersion having excellent dispersibility, thereby having a high concentration, and being capable of exhibiting low resistance properties.

BACKGROUND

Carbon nanotubes, which are a kind of fine carbon fiber, are tubular carbons having an average diameter of 1 μm or less. Due to the specific structure thereof, carbon nanotubes have high conductivity, high tensile strength, and high heat resistance, and thus, are expected to be applied to various fields and put into practical use. However, despite the usefulness of the carbon nanotubes, the use of carbon nanotubes is limited due to low solubility and low dispersibility thereof. Therefore, carbon nanotubes are pre-dispersed in a dispersion medium, and then a conductive material dispersion is prepared and used. However, due to strong Van der Waals attraction acting therebetween, carbon nanotubes agglomerate together instead of being stably dispersed in the dispersion medium.

There have been many attempts to solve the above problem. Specifically, there has been proposed a method of dispersing carbon nanotubes in a dispersion medium through a mechanical dispersion process such as an ultrasonic process. However, the method has a problem in that the dispersibility is excellent while carbon nanotubes are irradiated with ultrasonic waves, but when the irradiation with ultrasonic waves is terminated, the carbon nanotubes start to agglomerate.

There has been proposed another method for dispersing and stabilizing (homogenizing) carbon nanotubes using various dispersants. However, such methods also have a problem in that when carbon nanotubes are dispersed at a high concentration in a dispersion medium, it is difficult to handle the carbon nanotubes due to an increase in viscosity, and dispersion equipment is overloaded.

Alternatively, a method for performing a pre-dispersion using a high-speed mixer or a low-speed homogenizer before dispersing and stabilizing may be applied. However, since the method is a batch process, productivity is significantly reduced, so that it is difficult to apply the method to mass production.

Therefore, there has been a demand for the development of a carbon nanotube dispersion excellent in dispersibility, and there is a need for the development of a highly concentrated carbon nanotube dispersion having excellent resistance properties.

PRIOR ART DOCUMENT

JP 2015-115670 A1

SUMMARY

An aspect of the present invention provides a carbon nanotube dispersion having a viscosity controlled to a low level, excellent resistance properties, and a high concentration, by increasing the mixing of a dispersant and carbon nanotubes through an extrusion process when preparing a dispersion of carbon nanotubes, and controlling the particle size by a wet method.

According to an aspect of the present invention, there is provided a method for preparing a carbon nanotube dispersion, the method including mixing a dispersion solution including a dispersion solvent and a dispersant with carbon nanotubes to prepare carbon nanotube paste (S1), extruding the carbon nanotube paste to obtain solid carbon nanotubes (S2), and introducing a second solvent to the solid carbon nanotubes and then homogenizing the carbon nanotubes (S3), wherein the weight ratio of the dispersion solution to the carbon nanotubes is 1:1 to 9:1.

According to the method for preparing a carbon nanotube dispersion of the present invention, the mixing of a dispersant and carbon nanotubes is increased and the particle size is controlled by a wet method, so that a carbon nanotube dispersion having a viscosity controlled to a low level, excellent resistance properties, and a high concentration may be provided.

BRIEF DESCRIPTION OF THE DRAWING

FIG. 1 shows an example of an extruder which may be applied to the present invention.

DETAILED DESCRIPTION

Hereinafter, the present invention will be described in more detail to facilitate understanding of the present invention.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The term 'carbon nanotube' used in the present invention refers to a secondary structure in which unit cells of a carbon nanotube are aggregated in a bundle type in whole or in part. The unit cells of the carbon nanotube are configured such that a graphite sheet has a cylindrical shape having a nano-sized diameter, and has an $sp^2$ bond structure. At this time, depending on the angle and structure in which the graphite sheet is rolled, conductor properties or semiconductor properties may be exhibited. Depending on the number of bonds forming a wall, the unit cells of carbon nanotubes may be classified into a single-walled carbon nanotube (SWCNT) unit cell, a double-walled carbon nanotubes (DWCNT) unit cell, and a multi-walled carbon nanotube (MWCNT) unit cell. The thinner the wall, the lower the resistance.

The carbon nanotubes of the present invention may include one or more among a single-walled carbon nanotube unit cell, a double-walled carbon nanotube unit cell, and a multi-walled carbon nanotube unit cell.

Unless stated otherwise, the term a 'bundle type' used in the present invention refers to a secondary form in which a plurality of unit cells of a carbon nanotubes are arranged in substantially the same orientation as the axis in the longitudinal direction of the unit cells, or are in the form of a bundle or a rope in which unit cells are arranged and then twisted or intertwined. The terms such as a 'non-bundle type' or an 'entangled type' refer to a form which unit cells of a carbon nanotube are tangled without having a predetermined shape such as a bundle or a rope.

The method for preparing a carbon nanotube dispersion according to an embodiment of the present invention includes mixing a dispersion solution including a dispersion solvent and a dispersant with carbon nanotubes to prepare carbon nanotube paste (S1), extruding the carbon nanotube paste to obtain solid carbon nanotubes (S2), and introducing a second solvent to the solid carbon nanotubes followed by homogenizing (S3), wherein the weight ratio of the dispersion solution to the carbon nanotubes is 1:1 to 9:1.

According to the present invention, the S1 step is a pre-mixing step in which a dispersion solution and carbon nanotubes are mixed to prepare carbon nanotube paste, wherein the dispersion solution and the carbon nanotubes are mixed at a weight ratio of 1:1 to 9:1. Preferably, the dispersion solution and the carbon nanotubes may be mixed at a weight ratio of 1:1 to 7:1, more preferably 1:1 to 5:1.

When the weight ratio of the dispersion solution and the carbon nanotubes is less than 1:1, and thus the dispersion solution is included in less than 1 weight ratio based on the carbon nanotubes, viscosity becomes too high, so that the temperature may rise in a subsequent extrusion step. Accordingly, the solvent in the paste is volatilized, so that the concentration of the carbon nanotube dispersion may be increased, and due to the increase in concentration, and the homogenizing process may not be properly performed.

Also, when the dispersion solution exceeds 9 weight ratio based on the carbon nanotubes, the carbon nanotube paste is excessively dilute, so that the extrusion process may not be given a technical significance. In this case, there is no reason to perform an additional processing, such as extrusion processing, and the concentration of the carbon nanotube dispersion is too low, so that it may be difficult to implement the basic effect of improving the conductivity.

Accordingly, when preparing the carbon nanotube paste, it is necessary to appropriately adjust the weight ratio of the dispersion solution and the carbon nanotubes to 1:1 to 9:1 and to prepare the paste for the extrusion process in the above range.

Carbon nanotubes used in the method for preparing a carbon nanotube dispersion according to the present invention may be applied without any particular limitation as long as they are typically used. However, when the diameter of the unit cells of the carbon nanotubes is excessively large, the number of strands per volume is reduced, so that the amount of conductive material used increases. As a result, it is disadvantageous in manufacturing a high energy density electrode, and the pore diameter of the electrode is greatly increased, so that the electrode density may be reduced. Also, when the diameter of the unit cells of the carbon nanotubes is excessively small, it is difficult to achieve dispersion, so that the processibility of the dispersion is reduced. Also, the dispersed unit cells or the carbon nanotubes are buried in the space between electrode active material particles, so that sufficient pores are not formed. Accordingly, the average strand diameter of carbon nanotube unit cells in carbon nanotubes available in the present invention may be less than 30 nm, and considering the effect of improving the dispersibility of a conductive material and the effect of increasing solid similar properties, and the effect of improving coating stability of a composition for forming an electrode as a result of the diameter control of the unit cells, the average strand diameter of carbon nanotube unit cells may be 10 nm to 30 nm. The carbon nanotube unit cell refers to a single strand of carbon nanotubes.

Also, the longer the carbon nanotube unit cell, the lower the resistance of an electrode. Therefore, electrical conductivity may be excellent. If a carbon nanotube unit cell is short, it is difficult to efficiently form a conductive path. Accordingly, resistance is increased, so that electrical conductivity may be deteriorated. However, when a carbon nanotube unit cell is excessively long, dispersibility may be deteriorated. Therefore, the length of carbon nanotube unit cells in carbon nanotubes available in the present invention may be 0.5 μm to 200 μm. In addition, considering the diameter of the carbon nanotube unit cell, the carbon nanotube unit cell may have an aspect ratio of 5 to 50,000, more specifically 10 to 20,000, which is defined as a ratio of the length (the length of a long axis passing through the center of the unit cell) to the diameter (the length of a short axis passing through the center of the unit cell and perpendicular to the long axis) of the carbon nanotube unit cell.

In the present invention, the strand diameter and the length of the carbon nanotube unit cell may be measured by using an electric field radial scanning electron microscope.

Carbon nanotubes as described above may be commercially available, or may be prepared to be used. When prepared, the carbon nanotubes may be prepared by using a typical method such as an arc discharge method, a laser evaporation method or a chemical vapor deposition method. It is possible to implement the above-mentioned physical properties through the control of the type of catalyst, heat treatment temperature, and impurity removal method in the preparation process.

Specifically, when prepared by a chemical vapor synthesis method, the carbon nanotubes may be prepared by a preparation method including bringing a supported catalyst in which a metal catalyst is supported into contact with a spherical α-alumina support together with a carbon source under heating, and optionally, removing metal impurities in the carbon nanotubes when necessary.

According to the present invention, the dispersion solution includes a dispersion solvent and a dispersant, and the dispersion solution is mixed with carbon nanotubes to prepare paste. The dispersant may be introduced in an amount of 10 to 50 parts by weight, preferably 10 to 30 parts by weight, based on 100 parts by weight of the carbon nanotubes. When the dispersant and a solvent are mixed in the above range, it is possible to improve the dispersibility of the carbon nanotubes when finally preparing a carbon nanotube dispersion, and it may help to ensure stability after dispersion. In addition, the dispersion solvent may be added to the extent that the carbon nanotubes and the dispersant may be wetted when forming the paste within a range of 80 to 200 parts by weight based on 100 parts by weight of the carbon nanotubes.

As the solvent, both an aqueous solvent and an organic solvent may be used. For example, water; an amide-based polar organic solvent such as dimethylformamide (DMF), diethylformamide, dimethylacetamide (DMAc) and N-methylpyrrolidone (NMP); an alcohol such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol and octanol; a glycol such as ethylene glycol, diethylene glycol, triethylene glycol, propylene glycol, 1,3-propanediol, 1,3-butanediol, 1,5-pentanediol, and hexylene glycol; a polyhydric alcohol such as glycerin, trimethylol propane, pentaerythritol, and sorbitol; a glycol ether such as ethylene glycol monomethyl ether, diethylene glycol monomethyl ether, triethylene glycol monomethyl ether, tetraethylene glycol monomethyl ether, tthylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, and tetraethylene glycol monobutyl ether; a ketone such acetone, methyl ethyl ketone, methyl propyl ketone, and cyclopentanone; an ester such as ethyl acetate, γ-butyl lactone, and ε-propiactone. Any one thereof and a mixture of two or more thereof may be used. More specifically, when considering the effect of improving dispersibility of the carbon nanotubes and the dispersant, the solvent may be an amide-based polar organic solvent.

As the dispersant, both an aqueous dispersant and an organic dispersant may be used. The aqueous dispersant may be selected from, for example, styrene butylene rubber (SBR) or carboxymethyl cellulose (CMC), and the organic dispersant may be, for example, hydrogenated acrylonitrile butadiene rubber (H-NBR), polyvinylpyrrolidone (PVP), or polyvinyl butyral (PVB).

Typically, the dispersant may be introduced in a state dispersed or dissolved in a solvent, and the amount thereof may be determined by the content of the dispersant contained in the solvent.

According to the present invention, the S2 step is a step for obtaining solid carbon nanotubes in a pellet-like form by applying pressure and rotational force to the carbon nanotube paste prepared as described above, and is a step for applying an extrusion process. The solid carbon nanotubes may also be a solid in a state wetted in a solvent, and may be in the form closer to a solid than the paste of the S1 step.

The extrusion process may performed by using an extruder, and the extruder may preferably be a screw-type extruder. FIG. 1 shows an example of the extruder. According to FIG. 1, an extruder 10 may include a supply part 11 from which a material to be extruded is supplied; a rotary part 12 including a screw 121 to apply rotational force to the material so as to achieve uniform mixing, enhancing the internal penetration of a material into another material, and having an inner space; and a discharge part 13 including a discharge plate 131 having one or more discharge ports to discharge an extruded material. Any extruder comprising parts for serving the functions may be applied to the extrusion process of the present invention.

The rotational speed of the screw present in the rotary part may be, for example, 500-1500 rpm, preferably 800-1000 rpm. It is preferable that the rotational speed of the screw satisfies the above range. For example, it is preferable that the speed does not exceed 1500 rpm when considering the volatilization of the solvent due to temperature rise, and it is preferable that the speed is not less than 500 rpm when considering the improvement of dispersibility.

In addition, the extruder includes a discharge part and the discharge part may include a discharge plate such as a circular perforated plate. The discharge plate may have one or more discharge ports and the diameters of the discharge ports may be 1-5 mm and the ratio of the area of the discharge ports to the total area of the discharge plate, that is, the opening ratio of the discharge plate may be 20 to 50%.

In the discharge part of the extruder, when the diameter of the discharge port and the opening ratio of the discharge plate satisfy the above range, the dispersibility of the carbon nanotubes may be improved. The smaller the area ratio occupied by the discharge port in the discharge plate, and the smaller the diameter of the discharge port, the viscosity of the carbon nanotube dispersion may be controlled to a lower level, and the resistance properties tend to improve. However, when the diameter of the discharge port is too small, the force received by the carbon nanotube paste before the discharge may become too great, which may cause problems such as temperature rise, evaporation of the solvent, or the destruction of carbon nanotubes. Therefore, it is preferable to control the diameter of the discharge port and the opening ratio of the discharge plate within the above range.

The extrusion process may be a process to allow the dispersion solvent, the dispersant, and the carbon nanotubes to be mixed well so that the dispersant and the carbon nanotubes are in an uniformly mixed state, and a process to allow the dispersant to penetrate into the carbon nanotubes. Typically, a dispersion is prepared by dispersing carbon nanotubes using a high-speed mixer or a low-speed homogenizer. In this case, there is a productivity problem in that it is impossible to apply the process continuously, which makes it impossible to use the process continuously. When dispersion is performed by using only a high-pressure homogenizer, the agglomerates of carbon nanotubes absorb a solvent, causing a swelling phenomenon. Therefore, when the concentration of the carbon nanotube dispersion is only 3 wt %, there is a problem in that overload is applied to the homogenizer caused by the increase in viscosity due to the presence of carbon nanotube agglomerates which only raise viscosity while not serving the role of carbon nanotubes.

In order to solve such a problem, the method for preparing a carbon nanotube dispersion according to the present invention includes a step of performing an extrusion process using the extruder described above. When a carbon nanotube dispersion is prepared by pre-dispersing carbon nanotube paste using an extruder, pores inside carbon nanotubes are removed and the penetration of a dispersant into the carbon nanotubes is enhanced, thereby increasing the mixing of the dispersant and the carbon nanotubes, so that viscosity may be controlled to a low level.

In other words, typically, due to the fact that the mixing of the dispersing agent and the carbon nanotube is not uniform or a dispersant does not penetrate into carbon nanotubes, it is impossible to achieve contact thereof. Accordingly, carbon nanotubes are swelled in a dispersion process to form a number of large agglomerates, causing a problem in that the density of the carbon nanotubes is low but the viscosity thereof is high (most carbon nanotubes are present in the form of agglomerates). However, since a dispersant may penetrate into carbon nanotubes through the extrusion process before pre-dispersing the carbon nanotubes, dispersion is rapidly achieved and carbon nanotube agglomerates are disassembled. Therefore, dispersibility is maintained even after the dispersion.

Accordingly, even after the carbon nanotubes are dispersed, agglomerates are rarely present. Therefore, even when the concentration of the carbon nanotubes in the dispersion is high, dispersion is performed well, so that viscosity is low. Even when introduced into a homogenizer at a high concentration, due to the dispersant penetrated into the carbon nanotubes, a dispersion process may be achieved without applying overload to the homogenizer.

Also, the above-described extrusion process is a wet process, so that it is possible to control a diameter with humidity. Therefore, even when the concentration of a carbon nanotube dispersion is high, dispersibility is excellent, so that the process is advantageous in improving resistance properties. Furthermore, the extrusion process is fast and it is possible to perform the process continuously.

Therefore, the process may greatly contribute to improved processability in preparation of a carbon nanotube dispersion.

According to the present invention, the S3 step is a step in which the solid carbon nanotubes are homogenized. This process may be performed by a typical method. In general, the homogenization is performed by introducing a second solvent to the solid carbon nanotubes, followed by stirring.

In mixing the solid carbon nanotubes with the second solvent before the homogenization process may be such that 100 parts by weight of the solid carbon nanotubes and 150-300 parts by weight of the second solvent are mixed. The amount of the second solvent in the above range is an amount which is sufficient to control the concentration of carbon nanotubes in the carbon nanotube dispersion, and may be in an appropriate range when considering the dispersibility of the carbon nanotubes and the electrical conductivity of the dispersion. In addition, the second solvent may be the same kind as the dispersion solvent described above, or may be selected and applied independently of the dispersion solvent.

The homogenization may be performed by using a high-pressure homogenizer and/or milling equipment. The high-pressure homogenizer and/or the milling equipment may be equipment typically used in the art. When an extrusion process is not performed and the concentration of carbon nanotubes exceeds 3 wt %, a problem occurs in a homogenization process. However, when an extrusion process is performed by applying the preparation method according to the present invention, even when the concentration of carbon nanotubes is greater than 3 wt %, a dispersion may be prepared without any problems.

The homogenization may be a kind of cavitation dispersion process, which is a dispersion process method using shock waves generated by the rupture of vacuum bubbles formed in water when high energy is applied to a liquid. According to the method, dispersion may be achieved without damaging the properties of carbon nanotubes. Specifically, the cavitation dispersion process may be performed by ultrasound, a jet mill, or a shear dispersion process.

Specifically, when an ultrasound process is performed, the frequency may range from 10 kHz to 150 kHz, and the amplitude may range from 5 μm to 100 μm, and the irradiation time may be from 1 minute to 300 minutes.

The ultrasound generating device for performing the ultrasound process may be, for example, an ultrasonic homogenizer or the like. When a jet mill process is performed, the pressure may be 20 MPa to 250 MPa, and the process may be performed one or more times, specifically in a plurality of times of two or more times. Also, the jet mill dispersion device may be a high-pressure wet jet mill or the like.

During the cavitation dispersion process, the temperature is not particularly limited. However, the process may be performed at a temperature without the possibility of changing the viscosity of a dispersion due to the evaporation of a dispersion medium. Specifically, the process may be performed at a temperature of 50° C. or less, more specifically, at 15-50° C.

In addition, the milling may be performed by a ball mill, a bead mill, a basket mill, a high pressure homogenizer, or the like. More specifically, the milling may be performed by a milling method using a bead mill.

During the milling using a bead mill, the size of the bead mill may be appropriately determined according to the kind and amount of a conductive material and the kind of a dispersant. Specifically, the diameter of the bead mill may be 0.5 mm to 2 mm, more specifically, 1 mm to 2 mm. In addition, the bead milling process may be performed at a rate of 2,000 rpm to 4,500 rpm, more specifically, 2,000 rpm to 3,000 rpm.

The milling process may be performed according to the degree of dispersion of the carbon nanotube dispersion. Specifically, the process may be performed for 60 minutes to 120 minutes, more specifically, 60 minutes to 90 minutes.

EXAMPLES

Hereinafter, examples of the present invention will be described in detail so that those skilled in the art can easily carry out the present invention. The present invention may, however, be embodied in many different forms and is not limited to the examples set forth herein.

Example 1

500 g of N-methylpyrrolidone as a solvent and 2000 g of polyvinylpyrrolidone (PVP) solution (5% N-methylpyrrolidone (NMP)) as a dispersant were mixed to prepare a dispersion solution, and 500 g of carbon nanotubes were added thereto to prepare carbon nanotube paste.

The prepared carbon nanotube paste was introduced into an extruder and extruded, wherein the extruder is a feeder type extruder having no temperature control function, composed of a supply part, a rotary part and a discharge part, and in which a discharge plate has an opening ratio of 40% and a discharge port has a diameter of 3 mm. 3000 g of extruded solid carbon nanotubes were introduced into 7000 g of NMP, which is a second solvent, and mixed with a stirrer such that the concentration of carbon nanotubes finally prepared is 5 wt %, and then a composition was obtained.

The composition was passed through a high pressure homogenizer (PicoMax, MicroNox Co.) 10 times at a pressure of 1500 bar to disperse the carbon nanotubes, and finally to prepare a carbon nanotube dispersion.

Examples 2 to 5 and Comparative Examples 1 to 5

A carbon nanotube dispersion was prepared by applying the same conditions as in Example 1, except that the conditions shown in Table 1 below were applied to prepare the carbon nanotube dispersion.

TABLE 1

| | Dispersion | | | Extruder | | Homogenizer | |
|---|---|---|---|---|---|---|---|
| | Solvent | Dispersant | CNT weight ratio | Opening ratio of discharge plate | Diameter of discharge port (mm) | CNT concentration (wt %) | Number of passes |
| Example 1 | NMP | PVP | 5:1 | 40% | 3 | 5 | 10 |
| Example 2 | NMP | PVP | 3:1 | 50% | 3 | 5 | 10 |

TABLE 1-continued

| | Dispersion | | | Extruder | | Homogenizer | |
|---|---|---|---|---|---|---|---|
| | Solvent | Dispersant | CNT weight ratio | Opening ratio of discharge plate | Diameter of discharge port (mm) | CNT concentration (wt %) | Number of passes |
| Example 3 | NMP | PVP | 2:1 | 40% | 3 | 5 | 10 |
| Example 4 | NMP | PVP | 3:1 | 40% | 2 | 5 | 10 |
| Example 5 | NMP | PVP | 2:1 | 40% | 1 | 5 | 10 |
| Comparative Example 1 | NMP | PVP | 5:1 | X | X | 5 | 10 |
| Comparative Example 2 | NMP | PVP | 10:1 | 40% | 3 | 5 | 10 |
| Comparative Example 3 | Distilled water | PVP | 5:1 | 40% | 3 | 5 | 10 |
| Comparative Example 4 | NMP | X | 5:1 | 40% | 3 | 5 | 10 |
| Comparative Example 5 | NMP | PVP | 5:1 | 40% | 3 | X | X |

Experimental Example

Measurement of Physical Properties of Dispersion

Viscosity and electrode powder resistance were measured by the following method using the carbon nanotube dispersion prepared in each of Examples 1 to 5 and Comparative Examples 1 to 5, and the results are shown in Table 2 below.

1) Measurement of Viscosity 170 ml of the carbon nanotube dispersion was filled in a 200 ml beaker, and a #64 pin was placed thereinto using DV2T of Brookfield Co. to measure viscosity at 12 rpm. The measurement limit under the present measurement conditions is 50,000 cp.

2) Measurement of Electrode Powder Resistance

Manufacturing of Electrode

To 12.5 g of the carbon nanotube dispersion, 98 g of a NiMoCoOx series positive electrode active material, 23.3 g of a 6% PVDF (Kurary) solution, and 6 g of NMP were added, and the mixture was stirred using a stirrer to prepare electrode slurry. Thereafter, 20 g of the electrode slurry was placed into an aluminum dish having a diameter of 10 cm, and then dried in an oven for 15 hours at 150° C. Thereafter, the dried slurry was pulverized in a bowl to prepare a powder resistance measurement sample.

Measurement of Powder Resistance

As a powder resistance measurement device, MCP-PD51 of Loresta-GX Co. was used. 1 g of electrode powder was placed into a cell, and then when the pressure reached 400 KN, 800 KN, 1200 KN, 1600 KN, and 2000 KN, respectively, the thickness of the sample and the measured resistance value (Vr) were input into the software of the equipment to calculate a powder resistance value at a reference density of 2.7 g/cc.

TABLE 2

| | Carbon nanotube dispersion viscosity (cP) | Electrode powder resistance (Ωcm) |
|---|---|---|
| Example 1 | 26,000 | 211.0 |
| Example 2 | 21,000 | 167.0 |
| Example 3 | 18,000 | 141.0 |
| Example 4 | 18,500 | 131.0 |
| Example 5 | 16,000 | 99.8 |
| Comparative Example 1 | >50,000 (exceeding the measurement limit) | 367.0 |
| Comparative Example 2 | 44,000 | 355.0 |
| Comparative Example 3 | 1,530 | Electrode not manufactured due to PVDF agglomeration |
| Comparative Example 4 | >50,000 (exceeding the measurement limit) | 2,457 |
| Comparative Example 5 | >50,000 (exceeding the measurement limit) | 1,250 |

Referring to Table 2, in the cases of Comparative Example 1 in which a pre-dispersion process was not performed using an extruder as in the prior art, Comparative Example 4 in which PVP, which is a dispersant, was not used, and Comparative Example 5 in which a post-homogenizing process was not performed, the concentration of the carbon nanotubes in the high-pressure homogenizer was 5 wt %, exceeding 3 wt %, the viscosity thereof was significantly high, and the powder resistance thereof was also high at a very poor level.

That is, in the cases of Comparative Examples 1, 4, and 5, the dispersion of the carbon nanotubes was not properly achieved. Although not counted when measuring the concentration of the carbon nanotubes, it can be seen that there is an excessive amount of carbon nanotubes present in the form of agglomerates without being dispersed. As a result, the viscosity is high, and the powder resistance is also high due to carbon nanotubes that do not properly impart electrical conductivity.

In addition, in the case of Comparative Example 2, an extrusion process was performed. However, with respect to the weight ratio of the dispersion solution and the carbon nanotubes, the content of the dispersion solution was greater than 9 (based on a value of 1 for the carbon nanotubes). As a result, the viscosity was significantly high, and the resistance was evaluated at a level equivalent to that of Comparative Example 1 in which an extrusion process was not performed.

This is due to the fact that the carbon nanotube paste was formed to be too dilute, thereby not achieving the effect of the extrusion process. Specifically, in the extrusion process, the carbon nanotube paste was not applied with proper pressure, so that the dispersant did not wrap around the carbon nanotubes or penetrate into the carbon nanotubes, thereby not acting to improve dispersibility. As a result, there was a large amount of carbon nanotubes in the form of agglomerates, affecting the viscosity and the resistance to be evaluated to be high.

In addition, in the case of Comparative Example 3 in which distilled water instead of NMP was used as a solvent, the agglomeration of PVDF occurred in the following electrode manufacturing step, so that an electrode was not even manufactured.

On the other hand, in the cases of Examples 1 to 5 in which an extrusion process was performed before the dispersion process and a weight ratio of the dispersion solution to the carbon nanotubes of 1:1 to 9:1 was applied when preparing the paste, it can be seen that the resistance was reduced by as less as 40% to as much as 70%, and the viscosity was also greatly reduced compared to those of Comparative Examples.

Through these results, it can be confirmed that when a carbon nanotube dispersion is prepared by the preparation method of the present invention, it is possible to provide a dispersion capable of improving electrical conductivity by maintaining a low viscosity while allowing the concentration of carbon nanotubes to be high, thereby significantly reducing resistance.

DESCRIPTION OF DRAWING REFERENCE ELEMENTS

10: Extruder
11: Supply part
12: Rotary part
13: Discharge part
121: Screw
131: Discharge plate

The invention claimed is:

1. A method for preparing a carbon nanotube dispersion, the method comprising:
    mixing a dispersion solution, including a dispersion solvent and a dispersant, with carbon nanotubes to prepare carbon nanotube paste;
    extruding the paste to obtain solid carbon nanotubes; and
    introducing a second solvent to the solid carbon nanotubes in an amount of 150-300 parts by weight based on 100 parts by weight of the solid carbon nanotubes, and homogenizing the carbon nanotubes, wherein the weight ratio of the dispersion solution to the carbon nanotubes is 1:1 to 5:1.

2. The method of claim 1, wherein the dispersant is introduced in an amount of 10-50 parts by weight, based on 100 parts by weight of the carbon nanotubes.

3. The method of claim 1, wherein the extruding is performed with a screw-type extruder, and the extruder comprises:
    a supply part from which a material is supplied;
    a rotary part including a screw to apply rotational force to the material and having an inner space in which the material is mixed; and
    a discharge part including a discharge plate having one or more discharge ports to discharge an extruded material.

4. The method of claim 3, wherein the screw has a rotational speed of 500-1500 rpm.

5. The method of claim 3, wherein the discharge plate has an opening ratio of 20-50% and the discharge port has a diameter of 1-5 mm.

6. The method of claim 1, wherein the dispersion solvent and the second solvent are each independently one or more selected from the group consisting of water, methanol, ethanol, propanol, isopropanol, butanol, N-methyl pyrrolidone (NMP) and N, N-dimethylformamide (DMF).

7. The method of claim 1, wherein the dispersant is one or more selected from the group consisting of styrene butylene rubber (SBR), carboxymethyl cellulose (CMC), hydrogenated acrylonitrile butadiene rubber (H-NBR), polyvinylpyrrolidone (PVP), and polyvinylbutyral (PVB).

* * * * *